United States Patent
Deng (10) Patent No.: US 11,979,864 B2
(45) Date of Patent: May 7, 2024

(54) V2X TRANSMISSION METHOD AND DEVICE, AND USER EQUIPMENT

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 476 days.

(21) Appl. No.: 17/244,082

(22) Filed: Apr. 29, 2021

(65) Prior Publication Data

US 2021/0250948 A1    Aug. 12, 2021

Related U.S. Application Data

(63) Continuation of application No. PCT/CN2019/112699, filed on Oct. 23, 2019.

(51) Int. Cl.
| | |
|---|---|
| *H04W 72/0453* | (2023.01) |
| *H04B 17/318* | (2015.01) |
| *H04B 17/336* | (2015.01) |
| *H04W 4/40* | (2018.01) |

(52) U.S. Cl.
CPC ...... *H04W 72/0453* (2013.01); *H04B 17/318* (2015.01); *H04B 17/336* (2015.01); *H04W 4/40* (2018.02)

(58) Field of Classification Search
CPC ... H04W 72/0453; H04W 4/40; H04W 36/03; H04W 76/14; H04W 76/19; H04W 4/44; H04W 4/46; H04W 36/06; H04W 76/34; H04W 36/0011; H04W 36/0083; H04B 17/318; H04B 17/336
See application file for complete search history.

(56) References Cited

U.S. PATENT DOCUMENTS

| | | | |
|---|---|---|---|
| 2017/0188391 A1* | 6/2017 | Rajagopal | H04W 74/0816 |
| 2018/0317066 A1* | 11/2018 | Xu | H04W 40/02 |
| 2019/0021019 A1* | 1/2019 | Seo | H04W 72/1263 |

(Continued)

FOREIGN PATENT DOCUMENTS

| | | |
|---|---|---|
| CN | 106330387 A | 1/2017 |
| CN | 106658352 A | 5/2017 |

(Continued)

OTHER PUBLICATIONS

International Search Report issued in corresponding International Application No. PCT/CN2019/112699, dated Jan. 23, 2020, 8 pages.

(Continued)

*Primary Examiner* — Benjamin H Elliott, IV (74) *Attorney, Agent, or Firm* — HAUPTMAN HAM, LLP (57) ABSTRACT

A V2X transmission method and device, and a user equipment are provided. The method includes the following. Determine whether a PC5 link at a current frequency is suitable for V2X transmission during V2X transmission with a peer end. Switch to a PC5 link at another frequency for V2X transmission with the peer end or release the PC5 link at the current frequency, based on a determination that the PC5 link at the current frequency is no longer suitable for V2X transmission.

17 Claims, 2 Drawing Sheets

(56) References Cited

U.S. PATENT DOCUMENTS

| | | | | |
|---|---|---|---|---|
| 2019/0090107 A1* | 3/2019 | Kim | ..................... | H04W 76/11 |
| 2019/0394625 A1* | 12/2019 | Kim | ................. | H04W 36/0022 |
| 2021/0250948 A1* | 8/2021 | Deng | .................... | H04W 76/19 |
| 2022/0060934 A1* | 2/2022 | Ying | ....................... | H04W 4/40 |

FOREIGN PATENT DOCUMENTS

| | | |
|---|---|---|
| CN | 107018162 A | 8/2017 |
| CN | 107040959 A | 8/2017 |
| CN | 107734704 A | 2/2018 |
| CN | 108024264 A | 5/2018 |
| CN | 108207036 A | 6/2018 |
| WO | 2017122949 A1 | 7/2017 |

OTHER PUBLICATIONS

First Office Action issued in corresponding CN Application No. CN201811286790.9, dated Oct. 22, 2020, 12 pages.

Qualcomm Incorporated, "Discussion on QoS Design for NR PC5 Communication" 3GPP TSG-RAN WG2 Metting #103bis, R2-1814930, Chengdu, China, Oct. 8-12, 2018, pp. 1-3.

Huawei and HiSilicon. "Congestion Control for PC5-based V2X", 3GPP TSG-RAN WG2 Meeting #96, R2-167935, Reno, USA, Nov. 14-18, 2016, pp. 1-4.

\* cited by examiner

V2X TRANSMISSION METHOD AND DEVICE, AND USER EQUIPMENT

CROSS-REFERENCE TO RELATED APPLICATION(S)

This application is a continuation of International Application No. PCT/CN2019/112699, filed on Oct. 23, 2019, which claims priority to Chinese Patent Application No. 201811286790.9, filed on Oct. 31, 2018, the entire disclosures of which are hereby incorporated by reference.

TECHNICAL FIELD

This disclosure relates to the technical field of wireless communication, particular to a V2X (vehicle-to-everything) transmission method and device, and a user equipment.

BACKGROUND

In Release 12, ProSe (proximity-based service) direct communication is introduced in LIE (long term evolution). UE (user equipment) A and UE B (or multiple UEs) can perform direct communication through the PC5 interface. The PC5 interface is the direct interface between UEs.

There are two modes for resource allocation. One is the scheduled resource allocation, which is configured by a base station through dedicated signaling. The other is the autonomous resource selection. In this case, the base station can provide a resource pool for direct communication to the UE through system messages or RRC (radio resource control) signaling, so that the UE can select resources for direct communication from the resource pool. If the transmitter UE is not within the coverage of the network (i.e., the network coverage), the UE adopts the autonomous resource selection to select transmission resources for direct communication from a pre-configured resource pool.

Based on direct communication, 3GPP (3rd generation partnership project) also supports V2X. Within the network coverage, a UE can send V2X messages to multiple UEs. It is to be noted, both the receiving UE and the transmitting UE may not be within the network coverage or some UEs may be within the network coverage.

Currently, 3GPP is studying introduction of V2X to 5G (i.e., new radio, NR). This is because 5G can provide greater bandwidth and lower latency, and can better meet service requirements of V2X. Furthermore, 3GPP has also agreed that NR V2X can adopt unicast, groupcast, or broadcast to transmit V2X services. When the transmitting UE adopts unicast or groupcast, feedback can be introduced.

In this case, if two UEs are performing V2X transmission, UE A sends V2X data to UE B and UE B in turn needs to send feedback information to UE A. If the current link (bidirectional) fails, the failure needs to be solved, otherwise effectiveness of V2X transmission will be affected.

SUMMARY

A V2X transmission method and device, and a user equipment are provided, to in time solve the failure when a link for V2X transmission fails and ensure that V2X transmission continues at different available frequencies.

According to a first aspect, a V2X transmission method is provided. The method includes the following.

Determine whether a PC5 link at a current frequency is suitable for V2X transmission during V2X transmission with a peer end.

Switch to a PC5 link at another frequency for V2X transmission with the peer end or release the PC5 link at the current frequency, based on a determination that the PC5 link at the current frequency is no longer suitable for V2X transmission.

In at least one implementation, determine whether the PC5 link at the current frequency is suitable for V2X transmission as follows.

Determine that the PC5 link at the current frequency is no longer suitable for V2X transmission when any one of the following conditions is met.

Signal quality of the PC5 link at the current frequency is lower than a first threshold.

Physical resource blocks whose reference signal received power (RSRP) exceeds a second threshold in a transmission resource pool exceed a predetermined ratio.

A channel occupancy ratio of the transmission resource pool exceeds a third threshold.

A block error rate of a demodulation reference signal contained in V2X data received from the peer end exceeds a fourth threshold.

Signaling received from the peer end indicates that the PC5 link at the current frequency is no longer suitable for V2X transmission or the peer end requests to release the PC5 link at the current frequency.

In at least one implementation, switch to the PC5 link at another frequency for V2X transmission with the peer end or release the PC5 link at the current frequency as follows.

Whether there is a PC5 link at another frequency suitable for V2X transmission is detected and an instruction for frequency switching is sent to the peer end when there is a PC5 link at another frequency suitable for V2X transmission, where the instruction carries selectable frequency information.

Alternative frequency information or confirmation information is received from the peer end.

The PC5 link at the current frequency is switched to a PC5 link at an alternative frequency for V2X transmission.

In at least one implementation, switch to the PC5 link at another frequency for V2X transmission with the peer end or release the PC5 link at the current frequency as follows.

Whether there is a PC5 link at another frequency suitable for V2X transmission is detected and an instruction for frequency switching is sent to the peer end when there is a PC5 link at another frequency suitable for V2X transmission, where the instruction carries selectable frequency information.

An instruction for releasing the PC5 link at the current frequency is received from the peer end when the peer end finds no suitable alternative frequency.

The PC5 link at the current frequency is released.

In at least one implementation, the instruction for frequency switching is sent to the peer end as follows.

The instruction for frequency switching is sent to the peer end through sidelink control information (SCI), layer 2, or layer 3.

In at least one implementation, switch to the PC5 link at another frequency for V2X transmission with the peer end or release the PC5 link at the current frequency as follows.

Whether there is a PC5 link at another frequency suitable for V2X transmission is detected, an alternative frequency is determined when there is a PC5 link at another frequency suitable for V2X transmission, and the PC5 link at the current frequency is switched to a PC5 link at the alternative frequency for V2X transmission.

In at least one implementation, the signal quality of the PC5 link at the current frequency is lower than the first threshold when received power or a received signal-to-noise ratio of the demodulation reference signal contained in the V2X data received is lower than the first threshold or a received signal strength indicator (RSSI) corresponding to the V2X data received exceeds the first threshold.

According to a second aspect, a V2X transmission device is provided. The V2X transmission device includes a determining unit and a processing unit.

The determining unit is configured to determine whether a PC5 link at a current frequency is suitable for V2X transmission during V2X transmission with a peer end.

The processing unit is configured to switch to a PC5 link at another frequency for V2X transmission with the peer end or release the PC5 link at the current frequency, when the determining unit determines that the PC5 link at the current frequency is no longer suitable for V2X transmission.

In at least one implementation, the determining unit is configured to determine that the PC5 link at the current frequency is no longer suitable for V2X transmission when any one of the following conditions is met.

Signal quality of the PC5 link at the current frequency is lower than a first threshold.

Physical resource blocks whose RSRP exceeds a second threshold in a transmission resource pool exceed a predetermined ratio.

A channel occupancy ratio of the transmission resource pool exceeds a third threshold.

A block error rate of a demodulation reference signal contained in V2X data received from the peer end exceeds a fourth threshold.

Signaling received from the peer end indicates that the PC5 link at the current frequency is no longer suitable for V2X transmission or the peer end requests to release the PC5 link at the current frequency.

In at least one implementation, the processing unit is configured to: detect whether there is a PC5 link at another frequency suitable for V2X transmission, and send an instruction for frequency switching to the peer end when there is a PC5 link at another frequency suitable for V2X transmission, where the instruction carries selectable frequency information; receive alternative frequency information or confirmation information from the peer end; and switch the PC5 link at the current frequency to a PC5 link at an alternative frequency for V2X transmission.

In at least one implementation, the processing unit is configured to: detect whether there is a PC5 link at another frequency suitable for V2X transmission, and send an instruction for frequency switching to the peer end when there is a PC5 link at another frequency suitable for V2X transmission, where the instruction carries selectable frequency information; receive an instruction for releasing the PC5 link at the current frequency from the peer end when the peer end finds no suitable alternative frequency; and release the PC5 link at the current frequency.

In at least one implementation, the processing unit is configured to send the instruction for frequency switching to the peer end through SCI, layer 2, or layer 3.

In at least one implementation, the processing unit is configured to detect whether there is a PC5 link at another frequency suitable for V2X transmission, determine an alternative frequency when there is a PC5 link at another frequency suitable for V2X transmission, and switch the PC5 link at the current frequency to a PC5 link at the alternative frequency for V2X transmission.

In at least one implementation, the signal quality of the PC5 link at the current frequency being lower than the first threshold is: received power or a received signal-to-noise ratio of the demodulation reference signal contained in the V2X data received being lower than the first threshold or a RSSI corresponding to the V2X data received exceeding the first threshold.

According to a third aspect, a user equipment is provided. The user equipment includes at least one processor, a transceiver, and a memory. The memory stores instructions which, when executed by the at least one processor, cause the at least one processor to perform the method of the first aspect.

DETAILED DESCRIPTION

Technical solutions in implementations of the disclosure will be described clearly and completely hereinafter with reference to the accompanying drawings described. Apparently, the described implementations are merely some rather than all implementations of the disclosure. All other implementations obtained by those of ordinary skill in the art based on the implementations of the disclosure without creative efforts shall fall within the protection scope of the disclosure.

Figure 1:
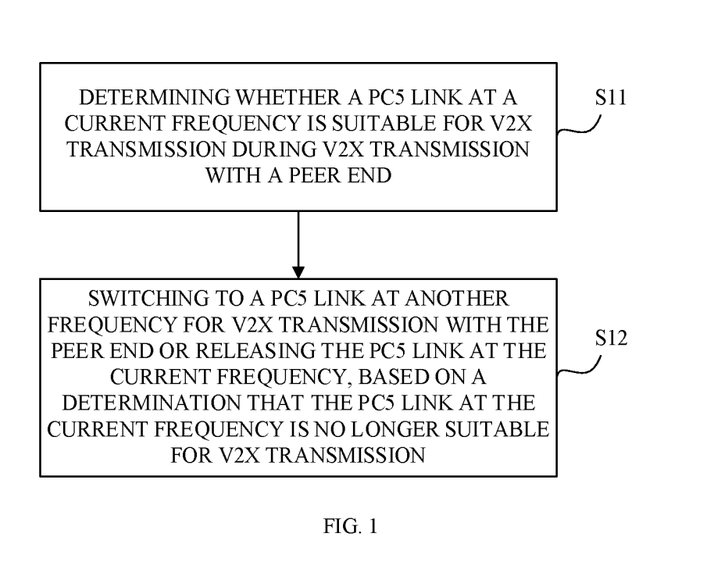
FIG. 1 is a schematic flow chart illustrating a V2X transmission method according to implementations.

Implementations provide a V2X transmission method. As illustrated in FIG. 1, the method begins at S11.

At S11, determine whether a PC5 link at a current frequency is suitable for V2X transmission during V2X transmission with a peer end.

In 5G, it has not been determined whether the direct interface between UEs still uses the PC5 interface. For simplicity, the PC5 interface herein refers to a direct interface between UEs, and a PC5 link is a link for direct communication (i.e., V2X transmission) between UEs.

At S12, switch to a PC5 link at another frequency for V2X transmission with the peer end or release the PC5 link at the current frequency, based on a determination that the PC5 link at the current frequency is no longer suitable for V2X transmission.

According to the V2X transmission method, during V2X transmission with the peer end, whether the PC5 link at the current frequency is suitable for V2X transmission is determined, and if not, switch to the PC5 link at another frequency for V2X transmission with the peer end or release the PC5 link at the current frequency. As such, it is possible to in time solve the failure when the link for V2X transmission fails and ensure that V2X transmission continues at different available frequencies.

It should be noted that in 5G, different frequencies can be represented by different absolute frequency values or can be represented by carriers, cells, or bandwidth parts (BWP) at different frequencies. For example, a cell can correspond to multiple BWPs, where each BWP can be located at a different subband. If a cell corresponds to four consecutive BWPs each with a bandwidth of 20 MHz, different BWPs can indicate different frequencies (and bandwidths). Therefore, switching to the PC5 link at another frequency may refer to switching to a PC5 link at a different BWP or at a different cell.

The following describes the V2X transmission method of the implementations in detail.

In the implementation, UE A as the transmitting end and UE B as the receiving end support 5G V2X. In the implementation, unicast is used for description. Further, groupcast is applicable. In the case of groupcast, there can be one or more receiving UEs, and for each UE, the following scheme is adopted.

UE A located in serving Cell 1 expects to send V2X data (or V2X service) to surrounding UE B. UE B may be located in serving Cell 1, or in a neighboring cell, or not within the network coverage.

UE A can detect that UE B is nearby through network assistance or through direct discovery, and then can perform V2X transmission.

UE A may request transmission resources for sending V2X services from Cell 1 or may select transmission resources for sending V2X services from a resource pool broadcast in the system message of Cell 1. When UE A transmits V2X services to UE B, the V2X services generally contain SCI and data on PSSCH (physical sidelink shared channel). The SCI indicates transmission resources occupied by the V2X data on PSSCH and other information. The SCI may also indicate information that UE B needs to feedback after receiving the V2X data.

UE B obtains a receiving resource pool needed for receiving V2X services through the system message, in a cell where UE B resides, or uses a pre-configured resource pool to receive V2X services when UE B is outside the network coverage.

UE A may have the ability to perform V2X transmission on multiple carriers simultaneously or in time sharing. In this case, transmission resources on the multiple carriers may be allocated by Cell 1, or partially allocated by Cell 1 and the rest allocated by the strongest cell at the frequency. For example, for the uplink carrier F1 of Cell 1, Cell 1 can allocate transmission resources on F1 to UE A. UE A further expects to transmit V2X services on carrier F2 and UE A detects that the strongest cell on F2 is Cell 3 (in time division duplex (TDD), the uplink and downlink carriers of the cell are the same, while in frequency division duplex (FDD), the uplink and downlink carriers of the cell are different, since V2X transmission occurs in the time slot of the uplink carrier, the UE detects the downlink carrier corresponding to F2 to obtain the strongest cell). In this case, UE A can obtain a configured resource pool for V2X transmission from the system message of Cell 3 and select appropriate resources from the configured resource pool to transmit V2X services.

Assuming that UE A transmits V2X services to UE B through F1, F2, and F3 simultaneously, on different carriers, different V2X services or the same V2X service can be transmitted.

UE B can enable a V2X data receiving function on one or more carriers and then feed back at the received frequency.

Assume that, at the beginning, UE B only receives V2X data on F1 and feeds back reception status to UE A on F1. In addition to feedback information, UE B can send V2X data generated by itself to UE A.

During V2X transmission, channel environments of the receiving UE (UE B) and the transmitting UE (UE A) may be very different. If UE A or UE B finds that the current frequency is not suitable for continuing V2X transmission, frequency switching is triggered.

In an example, either UE A or UE B triggers the frequency switching.

The following describes a case where UE B triggers the frequency switching. After UE B receives V2X data for a period of time and sends feedback, if one of the following conditions is met, the PC5 link at the current frequency (that is, the link where UE A transmits V2X data to UE B at the current frequency and the link where UE B sends feedback to UE A at the current frequency) is no longer suitable for V2X transmission.

1. UE B finds that signal quality of the PC5 link at the current frequency is lower than a first threshold.

In an example, UE B detects received power or a received signal-to-noise ratio of a demodulation reference signal contained in V2X data received. If the received power or the received signal-to-noise ratio is lower than the first threshold, the PC5 link at the current frequency is no longer suitable for V2X transmission. UE B can also detect interference status corresponding to the V2X data received, such as detect RSSI, if the RSSI corresponding to the V2X data received exceeds the first threshold, the PC5 link at the current frequency is no longer suitable for V2X transmission.

2. If UE B finds that a channel occupancy ratio of a feedback resource pool exceeds a preset threshold or detects that physical resource blocks whose RSRP exceeds a second threshold among resource blocks in the feedback resource pool exceed a predetermined ratio, UE B determines that the PC5 link at the current frequency is no longer suitable for V2X transmission. In this case, UE B is unable to select available resources from the feedback resource pool to transmit feedback.

3. If UE B also sends V2X data to UE A, UE B can select resources from a transmission resource pool to transmit V2X data and can sense available transmission resources. If UE B finds that physical resource blocks whose RSRP exceeds the second threshold among resource blocks in the transmission resource pool exceed a predetermined ratio, for example, 95%, or a channel occupancy ratio of the transmission resource pool exceeds a third threshold, UE B determines that the PC5 link at the current frequency is no longer suitable for V2X transmission.

4. UE B detects the demodulation reference signal contained in the V2X data received and the V2X data received. If UE B finds that a block error rate of the demodulation reference signal contained in the V2X data received exceeds a fourth threshold, for example, 10%, UE B determines that the PC5 link at the current frequency is no longer suitable for V2X transmission.

5. Signaling received by UE B from UE A indicates that the PC5 link at the current frequency is no longer suitable for V2X transmission or UE A requests to release the PC5 link at the current frequency.

In the above, for the first threshold, the second threshold, the third threshold, or the fourth threshold, if UE B is within the coverage of the cell, these thresholds can be set by the cell through the system message; if UE B is outside the network coverage, these thresholds can be pre-configured by the network or the protocol.

UE B can indicate UE A that something is wrong with the link at the current frequency and it is no longer suitable to continue V2X transmission over the PC5 link at the current frequency. In an example, UE B may send an instruction for frequency switching to UE A through SCI, layer 2, or layer 3. Herein, layer 2 and layer 3 are layer 2 and layer 3 of a protocol stack architecture at the PC5 interface between UE A and UE B. Layer 2 can include a media access layer and a radio link control layer and layer 3 can be a direct link control signaling layer.

In an example, at the same time, UE B can detect whether there is a link at another frequency suitable for V2X transmission. For example, UE B can detect whether the feedback resource pool on F2 is suitable, and if so, UE B can indicate selectable frequency information to UE A.

After UE A receives the indication sent by UE B, if UE A finds that there are available transmission resources on F2 and a channel occupancy ratio detected on F2 is lower than a predetermined threshold, UE A decides to switch the PC5 link. That is, UE A can indicate alternative frequency information to UE B in SCI of F1, indicating frequency information of F2. After feedback of UE B is received, UE A can switch to F2 and then UE B can switch the PC5 link at the current frequency to F2 for V2X transmission, which can ensure synchronous switching between UE A and UE B. Thereafter, UE A sends V2X data to UE B over the PC5 link on F2.

If UE A finds no suitable alternative frequency, UE A can release the PC5 link at the current frequency and send an instruction for releasing the PC5 link at the current frequency to UE B. After receiving the indication, UE B releases the PC5 link at the current frequency.

In at least one implementation, when detecting that there is a PC5 link at another frequency suitable for V2X transmission, UE B can determine an alternative frequency and switch the PC5 link at the current frequency to a PC5 link at the alternative frequency for V2X transmission. Before frequency switching of the PC5 link, UE B needs to signal a target frequency to-be-switched to UE A through SCI, layer 2, or layer 3.

The foregoing implementations describes a case where UE B triggers frequency switching or releases the PC5 link at the current frequency. In fact, in unicast, UE A and UE B are two peers, and thus UE A can also trigger frequency switching or release the PC5 link at the current frequency. The conditions according to which UE A determines that the PC5 link at the current frequency is no longer suitable for V2X transmission are the same as the conditions according to which UE B determines that the PC5 link at the current frequency is no longer suitable for V2X transmission. Furthermore, the operation that UE A triggers frequency switching or releases the PC5 link at the current frequency is the same as the above operation that UE B triggers frequency switching or releases the PC5 link at the current frequency. For details, reference can be made to the above execution process of UE B, which will not be repeated herein. In groupcast, it is slightly different. For example, UE A sends V2X groupcast services to UE B and UE C, and the conditions that the PC5 link at the current frequency is no longer suitable for V2X transmission determined by UE B are the same as the above. However, in groupcast, only UE A can make decisions on frequency switching.

Figure 2:
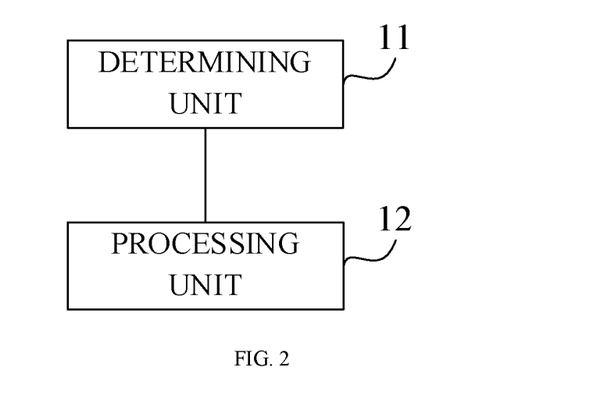
FIG. 2 is a schematic structural diagram illustrating a V2X transmission device according to implementations.

Implementations further provide a V2X transmission device. As illustrated in FIG. 2, the device includes a determining unit 11 and a processing unit 12.

The determining unit 11 is configured to determine whether a PC5 link at a current frequency is suitable for V2X transmission during V2X transmission with a peer end.

The processing unit 12 is configured to switch to a PC5 link at another frequency for V2X transmission with the peer end or release the PC5 link at the current frequency, when the determining unit 11 determines that the PC5 link at the current frequency is no longer suitable for V2X transmission.

According to the V2X transmission device, during V2X transmission with the peer end, whether the PC5 link at the current frequency is suitable for V2X transmission is determined, and if not, switch to the PC5 link at another frequency for V2X transmission with the peer end or release the PC5 link at the current frequency. As such, it is possible to in time solve the failure when the link for V2X transmission fails and ensure that V2X transmission continues at different available frequencies.

In at least one implementation, the determining unit 11 is configured to determine that the PC5 link at the current frequency is no longer suitable for V2X transmission when any one of the following conditions is met.

Signal quality of the PC5 link at the current frequency is lower than a first threshold.

Physical resource blocks whose RSRP exceeds a second threshold in a transmission resource pool exceed a predetermined ratio.

A channel occupancy ratio of the transmission resource pool exceeds a third threshold.

A block error rate of a demodulation reference signal contained in V2X data received from the peer end exceeds a fourth threshold.

Signaling received from the peer end indicates that the PC5 link at the current frequency is no longer suitable for V2X transmission or the peer end requests to release the PC5 link at the current frequency.

In at least one implementation, the processing unit 12 is configured to: detect whether there is a PC5 link at another frequency suitable for V2X transmission and send an instruction for frequency switching to the peer end when there is a PC5 link at another frequency suitable for V2X transmission, where the instruction carries selectable frequency information; receive alternative frequency information or confirmation information from the peer end; and switch the PC5 link at the current frequency to a PC5 link at an alternative frequency for V2X transmission.

In at least one implementation, the processing unit 12 is configured to: detect whether there is a PC5 link at another frequency suitable for V2X transmission and send an instruction for frequency switching to the peer end when there is a PC5 link at another frequency suitable for V2X transmission, where the instruction carries selectable frequency information; receive an instruction for releasing the PC5 link at the current frequency from the peer end when the peer end finds no suitable alternative frequency; and release the PC5 link at the current frequency.

In at least one implementation, the processing unit 12 is configured to send the instruction for frequency switching to the peer end through SCI, layer 2, or layer 3.

In at least one implementation, the processing unit 12 is configured to detect whether there is a PC5 link at another frequency suitable for V2X transmission, determine an alternative frequency when there is a PC5 link at another frequency suitable for V2X transmission, and switch the PC5 link at the current frequency to a PC5 link at the alternative frequency for V2X transmission.

The device of the implementation can be used to implement the technical solutions of the foregoing method implementations and its principles and technical effects are similar, which will not be repeated herein.

Figure 3:
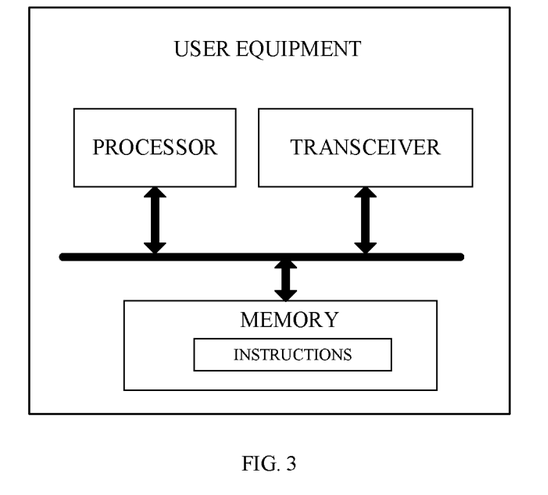
FIG. 3 is a schematic structural diagram illustrating a user equipment according to implementations.

Implementations further provide a user equipment. As illustrated in FIG. 3, the user equipment includes at least one processor, a transceiver, and a memory. The memory stores instructions which, when executed by the at least one processor, cause the at least one processor to perform the above method.

It should be noted that those of ordinary skill in the art may understand that all or part of the operations in the methods described in the foregoing implementations may be implemented by a computer program instructing hardware. The program may be stored in a computer readable storage medium. When executed, the above method can be performed. The storage medium may include a magnetic disk, an optical disk, a read only memory (ROM), a random access memory (RAM), or the like.

The above are some implementations of the disclosure, but the protection scope of the disclosure is not limited thereto. Any changes or substitutions that can be easily conceived by those skilled in the art within the technical scope disclosed by the disclosure should be covered by the protection scope of the disclosure. Therefore, the protection scope of the disclosure should be subject to the protection scope of the claims.

What is claimed is:

1. A V2X (vehicle-to-everything) transmission method, comprising:
   determining whether a PC5 link at a current frequency is suitable for V2X transmission during V2X transmission with a peer end; and
   switching to a PC5 link at another frequency for V2X transmission with the peer end or releasing the PC5 link at the current frequency, based on a determination that the PC5 link at the current frequency is no longer suitable for V2X transmission;
   determining whether the PC5 link at the current frequency is suitable for V2X transmission comprising:
      determining that the PC5 link at the current frequency is no longer suitable for V2X transmission in response to any one of the following conditions being met:
         signal quality of the PC5 link at the current frequency is lower than a first threshold;
         physical resource blocks whose reference signal received power (RSRP) exceeds a second threshold in a transmission resource pool exceed a predetermined ratio;
         a channel occupancy ratio of the transmission resource pool exceeds a third threshold;
         a block error rate of a demodulation reference signal contained in V2X data received from the peer end exceeds a fourth threshold; and
         signaling received from the peer end indicates that the PC5 link at the current frequency is no longer suitable for V2X transmission or the peer end requests to release the PC5 link at the current frequency.

2. The method of claim 1, wherein switching to the PC5 link at another frequency for V2X transmission with the peer end or releasing the PC5 link at the current frequency comprises:
   detecting whether there is a PC5 link at another frequency suitable for V2X transmission, and sending an instruction for frequency switching to the peer end in response to there being a PC5 link at another frequency suitable for V2X transmission, the instruction carrying selectable frequency information;
   receiving alternative frequency information or confirmation information from the peer end; and
   switching the PC5 link at the current frequency to a PC5 link at an alternative frequency for V2X transmission.

3. The method of claim 1, wherein switching to the PC5 link at another frequency for V2X transmission with the peer end or releasing the PC5 link at the current frequency comprises:
   detecting whether there is a PC5 link at another frequency suitable for V2X transmission, and sending an instruction for frequency switching to the peer end in response to there being a PC5 link at another frequency suitable for V2X transmission, the instruction carrying selectable frequency information;
   receiving an instruction for releasing the PC5 link at the current frequency from the peer end in response to the peer end finding no suitable alternative frequency; and
   releasing the PC5 link at the current frequency.

4. The method of claim 2, wherein sending the instruction for frequency switching to the peer end comprises:
   sending the instruction for frequency switching to the peer end through sidelink control information (SCI), layer 2, or layer 3.

5. The method of claim 1, wherein switching to the PC5 link at another frequency for V2X transmission with the peer end or releasing the PC5 link at the current frequency comprises:
   detecting whether there is a PC5 link at another frequency suitable for V2X transmission, determining an alternative frequency in response to there being a PC5 link at another frequency suitable for V2X transmission, and switching the PC5 link at the current frequency to a PC5 link at the alternative frequency for V2X transmission.

6. The method of claim 1, wherein the signal quality of the PC5 link at the current frequency being lower than the first threshold is: received power or a received signal-to-noise ratio of the demodulation reference signal contained in the V2X data received being lower than the first threshold, or a received signal strength indicator (RSSI) corresponding to the V2X data received exceeding the first threshold.

7. A non-transitory computer-readable storage medium storing a computer program thereon, which when executed by a processor, causes the processor to:
   determine whether a PC5 link at a current frequency is suitable for V2X transmission during V2X transmission with a peer end; and
   switch to a PC5 link at another frequency for V2X transmission with the peer end or release the PC5 link at the current frequency, based on a determination that the PC5 link at the current frequency is no longer suitable for V2X transmission, wherein
   the computer program, when executed by the processor, causing the processor to determine whether the PC5 link at the current frequency is suitable for V2X transmission causes the processor to: determine that the PC5 link at the current frequency is no longer suitable for V2X transmission when any one of the following conditions is met:
      signal quality of the PC5 link at the current frequency is lower than a first threshold;
      physical resource blocks whose reference signal received power (RSRP) exceeds a second threshold in a transmission resource pool exceed a predetermined ratio;
      a channel occupancy ratio of the transmission resource pool exceeds a third threshold;
      a block error rate of a demodulation reference signal contained in V2X data received from the peer end exceeds a fourth threshold; and
      signaling received from the peer end indicates that the PC5 link at the current frequency is no longer suitable for V2X transmission or the peer end requests to release the PC5 link at the current frequency.

8. The non-transitory computer-readable storage medium of claim 7, wherein the computer program, when executed by the processor, causing the processor to switch to the PC5 link at another frequency for V2X transmission with the peer end or release the PC5 link at the current frequency causes the processor to:
  detect whether there is a PC5 link at another frequency suitable for V2X transmission, and send an instruction for frequency switching to the peer end when there is a PC5 link at another frequency suitable for V2X transmission, the instruction carrying selectable frequency information;
  receive alternative frequency information or confirmation information from the peer end; and
  switch the PC5 link at the current frequency to a PC5 link at an alternative frequency for V2X transmission.

9. The non-transitory computer-readable storage medium of claim 7, wherein the computer program, when executed by the processor, causing the processor to switch to the PC5 link at another frequency for V2X transmission with the peer end or release the PC5 link at the current frequency causes the processor to:
  detect whether there is a PC5 link at another frequency suitable for V2X transmission, and send an instruction for frequency switching to the peer end when there is a PC5 link at another frequency suitable for V2X transmission, the instruction carrying selectable frequency information;
  receive an instruction for releasing the PC5 link at the current frequency from the peer end when the peer end finds no suitable alternative frequency; and
  release the PC5 link at the current frequency.

10. The non-transitory computer-readable storage medium of claim 8, wherein the computer program, when executed by the processor, causing the processor to send the instruction for frequency switching to the peer end causes the processor to:
  send the instruction for frequency switching to the peer end through sidelink control information (SCI), layer 2, or layer 3.

11. The non-transitory computer-readable storage medium of claim 7, wherein the computer program, when executed by the processor, causing the processor to switch to the PC5 link at another frequency for V2X transmission with the peer end or release the PC5 link at the current frequency causes the processor to:
  detect whether there is a PC5 link at another frequency suitable for V2X transmission, determine an alternative frequency when there is a PC5 link at another frequency suitable for V2X transmission, and switch the PC5 link at the current frequency to a PC5 link at the alternative frequency for V2X transmission.

12. The non-transitory computer-readable storage medium of claim 7, wherein the signal quality of the PC5 link at the current frequency being lower than the first threshold is: received power or a received signal-to-noise ratio of the demodulation reference signal contained in the V2X data received being lower than the first threshold, or a received signal strength indicator (RSSI) corresponding to the V2X data received exceeding the first threshold.

13. A user equipment, comprising:
  at least one processor;
  a transceiver; and
  a memory storing instructions which, when executed by the at least one processor, cause the at least one processor to:
    determine whether a PC5 link at a current frequency is suitable for V2X transmission during V2X transmission with a peer end; and
    switch to a PC5 link at another frequency for V2X transmission with the peer end or release the PC5 link at the current frequency, based on a determination that the PC5 link at the current frequency is no longer suitable for V2X transmission, wherein
    the at least one processor configured to determine whether the PC5 link at the current frequency is suitable for V2X transmission is configured to:
      determine that the PC5 link at the current frequency is no longer suitable for V2X transmission when any one of the following conditions is met:
        signal quality of the PC5 link at the current frequency is lower than a first threshold;
        physical resource blocks whose reference signal received power (RSRP) exceeds a second threshold in a transmission resource pool exceed a predetermined ratio;
        a channel occupancy ratio of the transmission resource pool exceeds a third threshold;
        a block error rate of a demodulation reference signal contained in V2X data received from the peer end exceeds a fourth threshold; and
        signaling received from the peer end indicates that the PC5 link at the current frequency is no longer suitable for V2X transmission or the peer end requests to release the PC5 link at the current frequency.

14. The user equipment of claim 13, wherein the at least one processor configured to switch to the PC5 link at another frequency for V2X transmission with the peer end or release the PC5 link at the current frequency is configured to:
  detect whether there is a PC5 link at another frequency suitable for V2X transmission, and send, via the transceiver, an instruction for frequency switching to the peer end when there is a PC5 link at another frequency suitable for V2X transmission, the instruction carrying selectable frequency information;
  receive, via the transceiver, alternative frequency information or confirmation information from the peer end; and
  switch the PC5 link at the current frequency to a PC5 link at an alternative frequency for V2X transmission.

15. The user equipment of claim 13, wherein the at least one processor configured to switch to the PC5 link at another frequency for V2X transmission with the peer end or release the PC5 link at the current frequency is configured to:
  detect whether there is a PC5 link at another frequency suitable for V2X transmission, and send, via the transceiver, an instruction for frequency switching to the peer end when there is a PC5 link at another frequency suitable for V2X transmission, the instruction carrying selectable frequency information;
  receive, via the transceiver, an instruction for releasing the PC5 link at the current frequency from the peer end when the peer end finds no suitable alternative frequency; and
  release the PC5 link at the current frequency.

16. The user equipment of claim 14, wherein the at least one processor configured to send, via the transceiver, the instruction for frequency switching to the peer end is configured to:
  send, via the transceiver, the instruction for frequency switching to the peer end through sidelink control information (SCI), layer 2, or layer 3.

17. The user equipment of claim 13, wherein the at least one processor configured to switch to the PC5 link at another frequency for V2X transmission with the peer end or release the PC5 link at the current frequency is configured to:
  detect whether there is a PC5 link at another frequency suitable for V2X transmission, determine an alternative frequency when there is a PC5 link at another frequency suitable for V2X transmission, and switch the PC5 link at the current frequency to a PC5 link at the alternative frequency for V2X transmission.

* * * * *